UNITED STATES PATENT OFFICE.

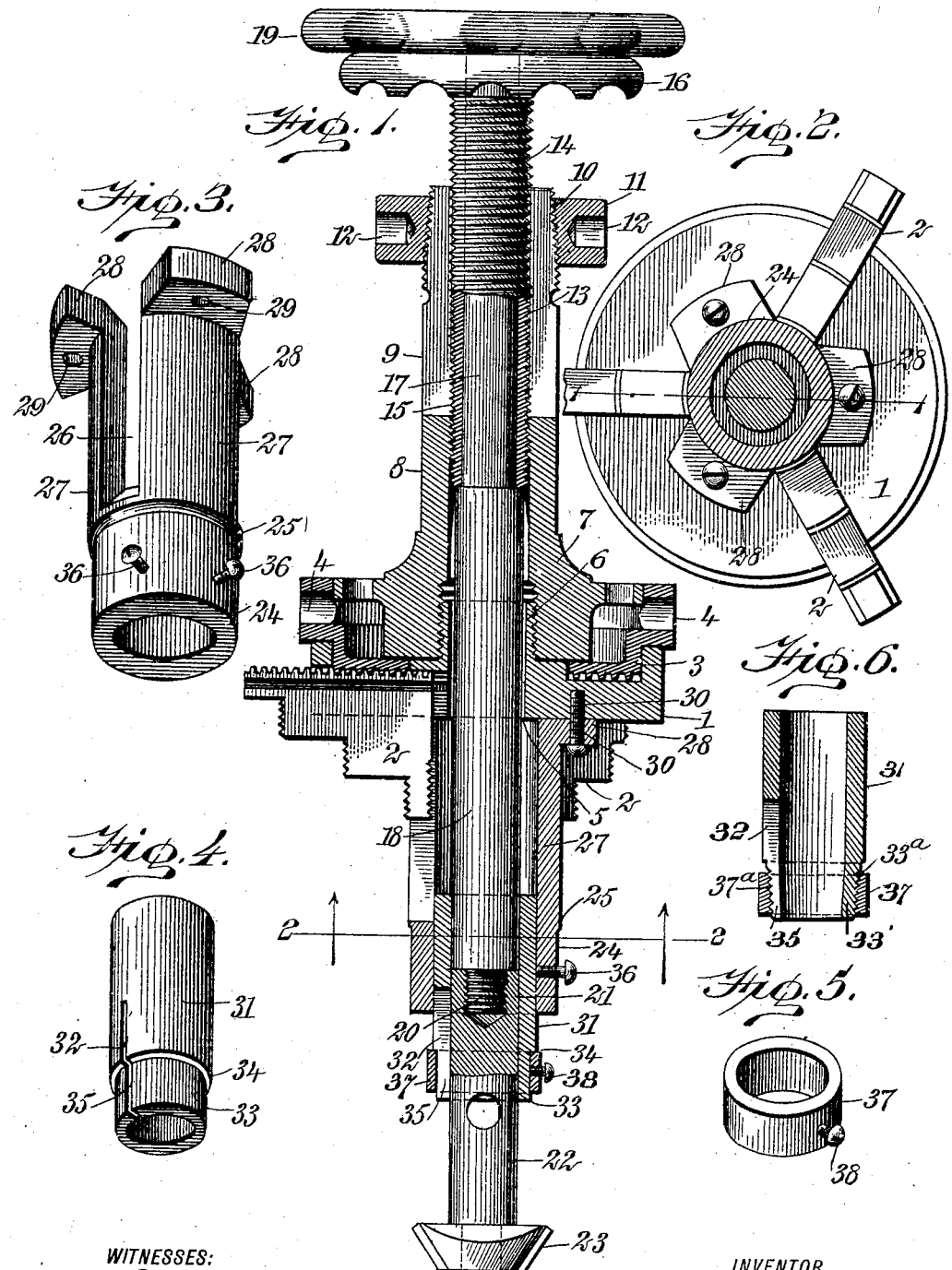

THOMAS B. WILLIAMS, OF ORANGE, MASSACHUSETTS, ASSIGNOR TO THE LEAVITT MACHINE CO., OF ORANGE, MASSACHUSETTS.

ROTARY CUTTING DEVICE.

No. 814,418.　　　Specification of Letters Patent.　　　Patented March 6, 1906.

Application filed July 7, 1905. Serial No. 268,657.

*To all whom it may concern:*

Be it known that I, THOMAS B. WILLIAMS, a citizen of the United States, and a resident of Orange, in the county of Franklin and State of Massachusetts, have invented a new and Improved Rotary Cutting Device, of which the following is a full, clear, and exact description.

This invention relates to cutting devices; and it consists, substantially, in the details of construction and combinations of parts hereinafter more particularly described, and pointed out in the claims.

The invention has reference more especially to hand-operated rotatable cutting devices—such, for instance, as ordinarily employed for dressing or resurfacing the seats of valves, faucets, and the like and a type of which is illustrated and described in Letters Patent No. 429,939, granted to Charles L. Morse on the 10th day of June, 1890.

One of the principal objects of the present invention is to provide a rotary cutting device of the type referred to of an embodiment to overcome certain disadvantages and objections frequently encountered in the use of other structures hitherto devised with like ends in view.

A further object is to provide a device of this kind which is simple in construction and comparatively inexpensive to manufacture, besides being thoroughly effective and reliable for its purposes and possessing the capacity for long and repeated service.

The above and additional objects are attained by means substantially such as are illustrated in the accompanying drawings, forming a part of this specification, in which like characters of reference designate like parts in all the views, and in which—

Figure 1 is a vertical sectional view of a rotary cutting device embodying my improvements, taken on the line 1 1 of Fig. 2. Fig. 2 is a transverse sectional view thereof upon the line 2 2 of Fig. 1. Fig. 3 is a view in perspective of the principal devices of my improvements. Figs. 4 and 5, respectively, are perspective views each of a certain element of the devices of my improvements, and Fig. 6 is a sectional detail view showing a slight modification of the structure illustrated in Fig. 4.

Before proceeding with a more detailed description it may be stated that in devices of this general character as at present employed in many instances the rotatable spindle included therein is of insufficient length for effecting certain kinds of work, and besides the same is frequently so bent or distorted in use that the entire device is rendered practically inoperative for its purposes, this being due principally to inadequacy of bearing-support for the spindle. This disadvantage and objection is overcome by my improvements, and in the form of my improvements herein shown I employ a chuck of ordinary form, combined with which are the usual radially-adjustable jaws and a rotatable disk or ring for operating the jaws in a well-known manner. Rigid with the chuck is a tubular member, and working in the tubular member is a suitable feed device for the rotatable spindle, which also works within said member, special means being employed in connection with the chuck for providing an increased bearing for the spindle whenever it may be necessary to adjust the latter longitudinally for appreciable portions of its length when employing the device in the repair of structures ordinarily designated as "deep-seated"—as a valve-seat, for instance, contained within a valve-casing located considerably within the engine or other structure on which employed.

While I have herein represented my present improvements in a certain preferred embodiment, it will be understood, of course, that I am not limited thereto in precise detail, since immaterial changes therein may be resorted to coming within the scope of my invention.

Reference being had to the drawings by the designating characters thereon, 1 represents a chuck provided with the usual radially-adjustable jaws 2 and having associated therewith a ring 3 for effecting the operation of said jaws in a manner well understood, said ring being provided at intervals of the periphery thereof with openings or recesses 4 for receiving the end of a suitable implement (not shown) to turn the ring relatively to the said chuck. The chuck is provided centrally with an opening 5, surrounding which, at the upper face of the chuck, is a flange 6, having an external screw-thread thereon, as shown in Fig. 1. Screwing upon the said flange 6 is the internally-threaded enlarged portion 7 of a tubular member 8, which is split from the upper end thereof for a suitable proportion of its length, as indicated at 9, said split portion of said tubular member being externally threaded and tapered at 10 for a suitable distance from the said upper end thereof and provided thereon with a ring 11, having at intervals of the periphery thereof suitable openings or recesses therein 12, also for the insertion of a suitable instrument for effecting the turning of the ring.

Working within the tubular member 7 from the upper end thereof is a tube 13, provided for its length with an external thread 14, engaging with a corresponding thread 15, formed interiorly of the member, said tube being provided at its upper end with a rigid handle or hand-wheel 16 for enabling the turning of the same to be effected. Working within said tube 13 is the reduced portion 17 of a rotatable spindle 18, provided at the upper end thereof with a rigid handle or hand-wheel 19 for operating the same and at its lower end, preferably in this instance, with a reduced externally-threaded member 20, to which is fitted the internally-threaded end portion 21 of an extension 22 of said spindle, having at the end thereof any suitable form of cutting-tool 23 designed to effect the repairing or resurfacing of the valve-seat or other structure whenever the device is properly maintained with respect thereto, as is well understood.

As thus constructed, it will be seen that the rotatable spindle has but a limited bearing-support within the tubular member 7, in which it works, and whenever it becomes necessary to adjust the spindle longitudinally for an appreciable extent of its length said spindle is very liable to become bent out of proper alinement for effective operations, to prevent which I employ the attachment for the structure about to be described. It should also be mentioned at this point that the use of the extension 22 of the spindle is preferably employed on account of the exceedingly slow manner of effecting longitudinal adjustments of the spindle, usually accomplishable only through the feed devices for the spindle.

As shown in Fig. 1, I apply to the lower face of the chuck 1 what may be termed a "circular" yoke 24, having an annular shoulder 25 and cut out at different places longitudinally at 26 to form a plurality of legs 27, provided with laterally-extending feet 28, having holes or openings 29 therein, through each of which a screw 30 is inserted for securing the said yoke to the chuck substantially concentrically with the central opening of the chuck.

Fitting within the said circular yoke 24 is a bushing 31, which is split at 32 for a suitable distance from its lower end and is provided with a reduced portion 33 to form an annular shoulder 34, said reduced portion being correspondingly split at 35. (See Fig. 4.) The said bushing is adjustable longitudinally within the said circular yoke 24 and is held in the different positions of adjustment thereof by means of one or more set-screws 36, working through openings therefor in the yoke, and fitting upon the said reduced portion 33 of the bushing and resting against the annular shoulder 34 thereof is a close-fitting ring 37, provided also with a set-screw 38. The internal diameter of the said bushing and its reduced portion is such as to receive portions of both the spindle 18 and the extension 22 thereof approximately snugly, and it will also be seen that the bushing is adjustable within the yoke, as already suggested, thus enabling the extent of longitudinal bearing-support for the spindle to be lengthened in proportion to the demands of adjustments of said spindle. Due to the split character of the bushing the same may be caused to hug more closely the portion of the rotatable spindle extending therethrough by simple adjustment of the set-screw 38 of the ring 37, as is apparent.

The general operation of the device herein disclosed will be fully understood by those skilled in the art, and hence no specific description thereof is deemed essential herein, and it is thought that the purpose and operation of the improvements set forth will be fully understood from what has already been stated. It may be repeated, however, and emphasized at this point that the principal object of the present invention is to provide an increased or extensible bearing-support for the rotatable spindle, located exteriorly to the structure and capable of being lengthened or shortened in proportion to the different longitudinal adjustments of the spindle found necessary to be made under varying conditions of use of the structure.

As shown in Fig. 6, it is sometimes preferable to form the reduced portion 33 of the bushing 31 slightly tapered and externally screw-threaded at 33ª either for part of its length only or for its full length, and in which case the ring 37 is internally threaded at 37ª to be turned or adjusted on said reduced portion 33 to cause the same to hug the spindle more or less closely.

Having thus described my invention, I claim as new and desire to secure by Letters Patent—

1. A device of the character described comprising a chuck, a tubular member thereon, a rotatable spindle working within the tubular member and provided with a cutter, a feed connection between the spindle and the tubular member, means whereby to disconnect the feed connection, a second tubular member on the chuck and in alinement with the first member, a bushing in the free end of the second tubular member, and means whereby to adjust the bushing longitudinally of said tubular member, the said tubular member and the bushing extending in the direction of the cutter and adjacent thereto.

2. A device of the character described, comprising a chuck, a tubular member thereon, a rotatable spindle working in the tubular member and chuck and provided with a cutter, and means applied to the opposite face of the chuck for furnishing an extended bearing-support for said spindle, embodying a circular yoke and a longitudinally-adjustable bushing thereon, the said yoke and bushing extending in the direction of the cutter and adjacent thereto.

3. A device of the character described comprising a chuck, a tubular member thereon, a rotatable spindle working in the tubular member and chuck and provided with a cutter, and means applied to the opposite face of the chuck for furnishing an extended bearing-support for said spindle, embodying a circular yoke and a longitudinally-adjustable bushing thereon provided with a ring having a set-screw, the yoke and bushing extending in the direction of the cutter and adjacent thereto.

4. As an attachment for a rotary cutting device of the character herein described, a yoke having means for securing the same to the chuck of the device and provided with an extensible bushing, the said yoke and bushing extending in the direction of the cutting device and adjacent thereto.

In testimony whereof I have signed my name to this specification in the presence of two subscribing witnesses.

THOMAS B. WILLIAMS.

Witnesses:
 FRED A. DEXTER.
 EDWARD J. WOOD.